United States Patent
Muehlmann et al.

(10) Patent No.: US 11,908,296 B2
(45) Date of Patent: Feb. 20, 2024

(54) SYSTEM, DEVICE AND METHODS FOR PROTECTING A USER DEVICE

(71) Applicant: NXP B.V., Eindhoven (NL)

(72) Inventors: Ulrich Andreas Muehlmann, Graz (AT); Michael Schober, Graz (AT); Ghiath Al-kadi, Graz (AT)

(73) Assignee: NXP B.V., Eindhoven (NL)

( * ) Notice: Subject to any disclaimer, the term of this patent is extended or adjusted under 35 U.S.C. 154(b) by 78 days.

(21) Appl. No.: 17/412,926

(22) Filed: Aug. 26, 2021

(65) Prior Publication Data
US 2022/0068098 A1    Mar. 3, 2022

(30) Foreign Application Priority Data
Sep. 1, 2020 (EP) .................................... 20193823

(51) Int. Cl.
*G08B 13/24* (2006.01)
*H04W 4/029* (2018.01)
(Continued)

(52) U.S. Cl.
CPC ....... *G08B 13/2402* (2013.01); *H04B 1/7163* (2013.01); *H04W 4/029* (2018.02); *H04W 12/08* (2013.01); *H04W 12/63* (2021.01)

(58) Field of Classification Search
CPC . G08B 13/2402; H04B 1/7163; H04W 4/029; H04W 12/08; H04W 12/63; H04W 12/64; H04W 12/79
(Continued)

(56) References Cited

U.S. PATENT DOCUMENTS 7,075,433 B2    7/2006  Singer
10,638,404 B1 *  4/2020  Chenault ............. H04W 12/082
(Continued)

FOREIGN PATENT DOCUMENTS

EP    2015103 A1 *  1/2009  ............. G01S 11/06
EP    2015103 A1    1/2009
WO    2011044915 A1  4/2011

OTHER PUBLICATIONS

Grosswindhager, B., "SnapLoc: An Ultra-Fast UWB-Based Indoor Localization System for an Unlimited Number of Tags", 2019 Association for Computing Machinery, ACM ISBN 978-1-4503-6284, Sep. 19, 2004.
(Continued)

*Primary Examiner* — Omar Casillashernandez (57) ABSTRACT

In accordance with a first aspect of the present disclosure, a system is provided, comprising: a user device to be monitored for unauthorized displacement, an ultra-wideband (UWB) communication unit configured to set up a UWB communication channel with an external localization device and to perform at least one localization operation through said UWB communication channel, and a processing unit configured to detect said unauthorized displacement of the user device by analyzing an output of said localization operation. In accordance with a second aspect of the present disclosure, a localization device is provided, comprising: an ultra-wideband (UWB) communication unit configured to set up a UWB communication channel with an external system and to perform at least one localization operation through said UWB communication channel, and a processing unit configured to detect an unauthorized displacement of a user device comprised in said external system by analyzing an output of said localization operation. In accordance with further aspects of the present disclosure, corre-
(Continued)

sponding methods are conceived and corresponding computer programs are provided.

19 Claims, 6 Drawing Sheets

(51) Int. Cl.
H04W 12/63 (2021.01)
H04B 1/7163 (2011.01)
H04W 12/08 (2021.01)

(58) Field of Classification Search
USPC .................................................. 340/572.1
See application file for complete search history.

(56) References Cited

U.S. PATENT DOCUMENTS

| | | | |
|---|---|---|---|
| 2007/0226778 A1 | 9/2007 | Pietruszka | |
| 2011/0006897 A1* | 1/2011 | Micko | G08B 13/191 340/565 |
| 2013/0002413 A1 | 1/2013 | Du et al. | |
| 2014/0344946 A1* | 11/2014 | Ward | H04W 12/06 726/26 |
| 2016/0019765 A1* | 1/2016 | Stokes | G08B 13/1436 340/572.1 |
| 2017/0357934 A1* | 12/2017 | Cobb | G06Q 10/087 |
| 2018/0025616 A1* | 1/2018 | Lin | G08B 29/185 340/501 |
| 2018/0324166 A1 | 11/2018 | Lagerstedt et al. | |
| 2019/0057586 A1* | 2/2019 | Kangralkar | H04W 4/029 |
| 2020/0051411 A1* | 2/2020 | Grace | H04W 4/029 |
| 2020/0186962 A1 | 6/2020 | Moeller | |
| 2021/0201257 A1* | 7/2021 | Mohamed | G06Q 30/0201 |

OTHER PUBLICATIONS

Qiu, L., "PATL: A RFID Tag Localization based on Phased Array Antenna", www.nature.com/scientificreports, DOI: 10.1038/srep44183, published Mar. 15, 2017.

* cited by examiner

SYSTEM, DEVICE AND METHODS FOR PROTECTING A USER DEVICE

CROSS-REFERENCE TO RELATED APPLICATIONS

This application claims the priority under 35 U.S.C. § 119 of European Patent application no. 20193823.0, filed on 1 Sep. 2020, the contents of which are incorporated by reference herein.

TECHNICAL FIELD

The present disclosure relates to a system, a localization device, corresponding methods and corresponding computer programs for protecting a user device against unauthorized displacement.

BACKGROUND

Many user devices should be protected against theft or, more generally speaking, against unauthorized displacement. Such a protection may for example be realized using radio frequency identification (RFID) tags which are attached to user devices, by means of which the movement of the user devices can be tracked. It may be desirable to increase the level of protection against the unauthorized displacement of user devices.

SUMMARY

In accordance with a first aspect of the present disclosure, a system is provided, comprising: a user device to be monitored for unauthorized displacement, an ultra-wideband (UWB) communication unit configured to set up a UWB communication channel with an external localization device and to perform at least one localization operation through said UWB communication channel, and a processing unit configured to detect said unauthorized displacement of the user device by analyzing an output of said localization operation.

In one or more embodiments, the user device comprises the UWB communication unit and the processing unit or the UWB communication unit and the processing unit are attached to the user device.

In one or more embodiments, the UWB communication unit and the processing unit are attached to the user device by a physical bonding.

In one or more embodiments, the processing unit is further configured to disable one or more functions of the user device or one or more applications executed by the user device in response to detecting the unauthorized displacement.

In one or more embodiments, the processing unit is configured to detect unauthorized displacement by comparing location data output by said localization operation with one or more predefined sets of location data indicative of authorized locations of the user device.

In one or more embodiments, the predefined sets of location data represent areas or zones in a building.

In one or more embodiments, the processing unit is a secure element.

In accordance with a second aspect of the present disclosure, a localization device is provided, comprising: an ultra-wideband (UWB) communication unit configured to set up a UWB communication channel with an external system and to perform at least one localization operation through said UWB communication channel, and a processing unit configured to detect an unauthorized displacement of a user device comprised in said external system by analyzing an output of said localization operation.

In one or more embodiments, the processing unit is further configured to activate an alarm or transmit a warning signal in response to detecting the unauthorized displacement.

In one or more embodiments, the processing unit is configured to transmit, through the UWB communication channel or through an out-of-band communication channel, an instruction to disable one or more functions or applications of the user device to the external system.

In accordance with a third aspect of the present disclosure, a method is conceived, comprising: setting up, by an ultra-wideband (UWB) communication unit of a system that includes a user device, a UWB communication channel with an external localization device and performing at least one localization operation through said UWB communication channel, and detecting, by a processing unit of said system, an unauthorized displacement of the user device by analyzing an output of said localization operation.

In one or more embodiments, the processing unit further disables one or more functions of the user device or one or more applications executed by the user device in response to detecting the unauthorized displacement.

In accordance with a fourth aspect of the present disclosure, a method is conceived, comprising: setting up, by an ultra-wideband (UWB) communication unit of a localization device, a UWB communication channel with an external system and performing at least one localization operation through said UWB communication channel, and detecting, by a processing unit of the localization device, an unauthorized displacement of a user device comprised in said external system by analyzing an output of said localization operation.

In one or more embodiments, the processing unit further activates an alarm or transmits a warning signal in response to detecting the unauthorized displacement.

In accordance with a fifth aspect of the present disclosure, a computer program is provided, comprising instructions which, when executed by a system of the kind set forth or by a localization device of the kind set forth, carry out methods of the kind set forth.

DESCRIPTION OF DRAWINGS

Embodiments will be described in more detail with reference to the appended drawings, in which.

DESCRIPTION OF EMBODIMENTS

As mentioned above, many user devices should be protected against theft or, more generally speaking, against unauthorized displacements. Such a protection may for example be realized using radio frequency identification (RFID) tags which are attached to user devices, by means of which the movement of the user devices can be tracked. It may be desirable to increase the level of protection against unauthorized displacements of user devices.

Figure 1:
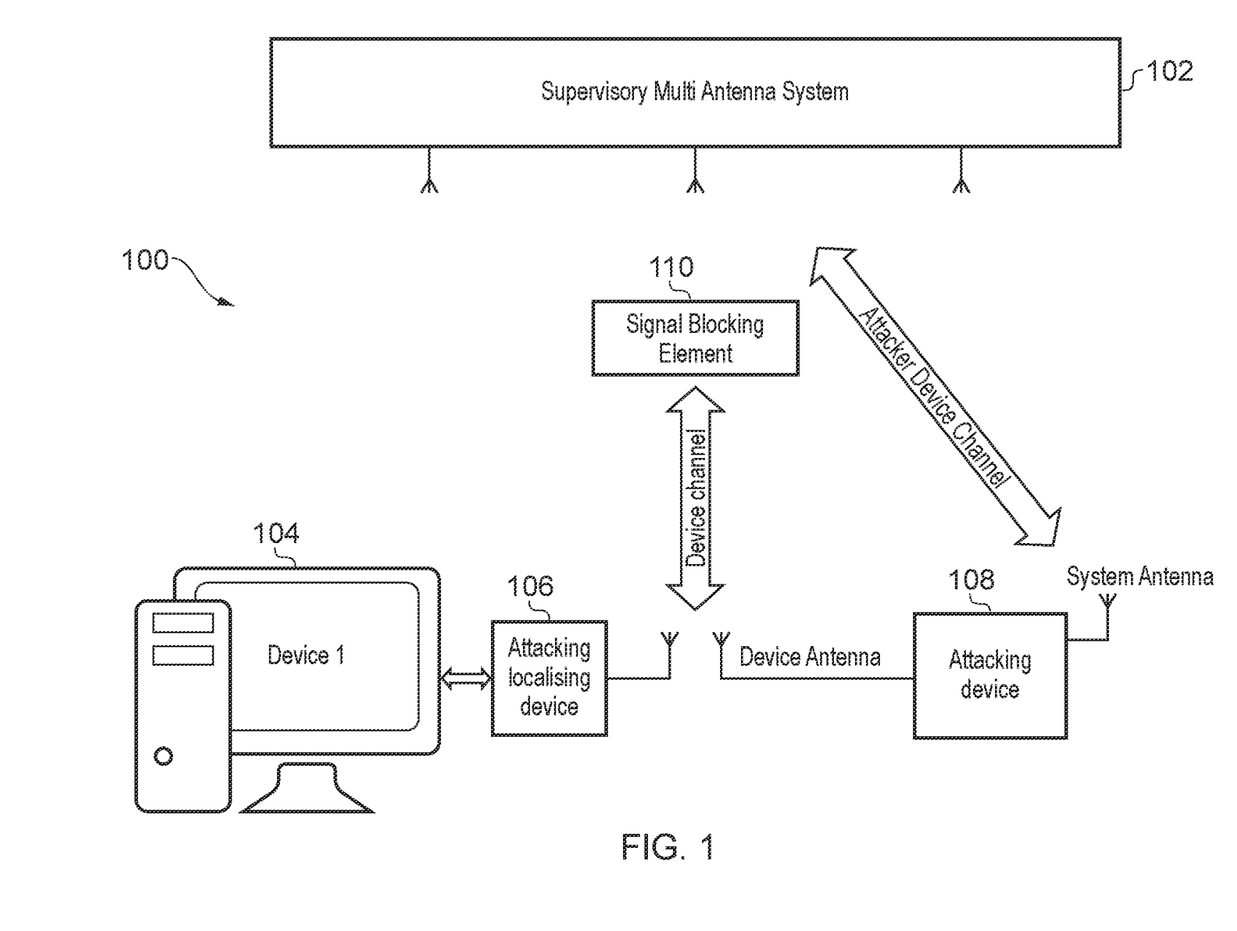
FIG. 1 shows an example of an attack scenario.

FIG. 1 shows an example of an attack scenario 100. In this scenario 100, a user device 104 is being protected by a supervisory multi-antenna system 102, by means of which the location of the user device 104 can be determined and its movement can be tracked. For this purpose, a localizing device 106 is attached to the user device 104. This localizing device 106 may for example be an RFID tag. In that case, the supervisory multi-antenna system 102 may establish a communication channel with the RFID tag, such that the location of the tag and the attached user device 104 can be determined. However, if a signal blocking element 110 is placed between the localizing device 106 and the multi-antenna system. 102, then the latter may not be able to receive the signals of the former, such that the position of the user device cannot be determined. In addition, an attacking device 108 might simulate the localizing device 108 by sending similar signals. This type of attack is commonly referred to as a replay attack or a relay attack.

In particular, the systems that are typically employed for localizing devices use Phase Difference of Arrival (PDOA), Received Signal Strength Indication (RSSI), Time Difference of Arrival (TDOA) or a Time of Flight (TOF) measurement technique for determining the position of a device within a room. FIG. 1 shows an example of a laboratory system that may be used for localizing devices. The system includes a supervisory system 102 that is tracking the devices inside the room and a user device 104 (a laboratory computer referred to as "Device1") that should be tracked. In the given example, the channel between the supervisory system 102 and laboratory computer 104 is blocked by an attacker. Every time when the supervisory system 102 attempts to localize Device1 the attacker receives the signal and forwards it to Device1. The response of Device1 is again forwarded by the attacker to the supervisory system 102. As a consequence, the system 102 concludes that Device1 is present at the position of the attacking device, which may still be an authorized location (i.e., a location at which also Device1 may be legitimately present). Thus, Device1 can be stolen as long the communication is still forwarded by the attacker. Furthermore, if the device that is responsible for the localization or theft prevention (i.e., the so-called localizing device 106 shown in FIG. 1) is only attached to the user device that needs to be protected, it is even easier to steal the user device because the localizing device can simply be disconnected. As long as the localizing device is powered and running, the supervising system is not able to determine that the attached device has been stolen.

Figure 2A:
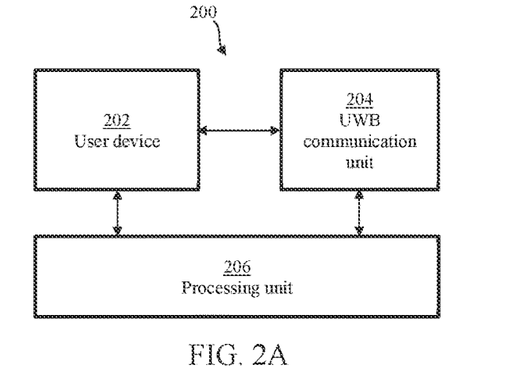
FIG. 2A shows an illustrative embodiment of a system for protecting a user device.

FIG. 2A shows an illustrative embodiment of a system 200 for protecting a user device 202. The system 200 comprises the user device 202, an ultra-wideband (UWB) communication unit 204 and a processing unit 206. The UWB communication unit 204 is configured to set up a UWB communication channel with an external localization device (not shown) and to perform at least one localization operation through said MB communication channel 204. Furthermore, the processing unit 206 is configured to detect an unauthorized displacement of the user device 202 by analyzing an output of said localization operation. In this way, the level of protection against the unauthorized displacement of user devices may be increased.

In particular, UWB is a communication technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices. The inventors have recognized that the latter characteristic of UWB may be used to advantage to accurately and reliably detect an unauthorized displacement of user devices. In particular, UWB can be used for distance measurements which are resistant to replay attacks or relay attacks, which in turn increases the level of security.

It is noted that the UWB communication unit 204 may be a UWB transceiver that can easily be integrated into a user device or plugged into a power socket, for example. The system 200 may offer a secure localization and theft protection by combining it with a UWB-based infrastructure comprising one or multiple anchors. Furthermore, such a system may be used for non-secure localization. Additionally, the system may contain a secure element that can for example disable a device function or application automatically if the device is stolen, which makes the device effectively unusable for the thief.

Figure 2B:
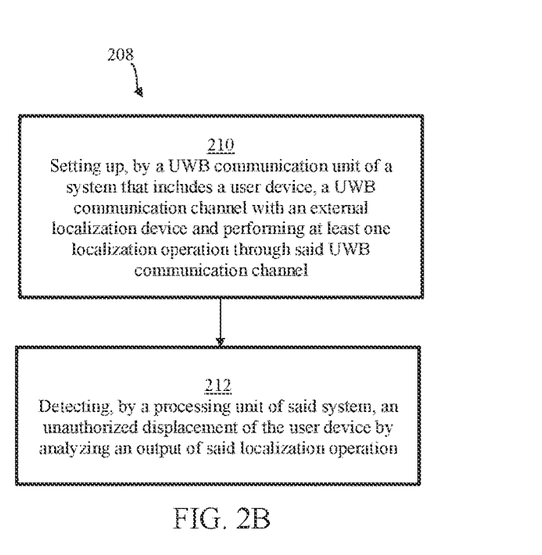
FIG. 2B shows an illustrative embodiment of a method for protecting a user device.

It is noted that an unauthorized displacement may be regarded as a displacement of a user device which violates a predefined rule, wherein said predefined rule defines at which locations the user device is legitimately present (i.e., at which locations the user device is authorized to be present). Accordingly, an unauthorized displacement means that the user device moves to a location at which it is not legitimately present according to a predefined rule. Furthermore, a localization operation may be regarded as an operation that determines the location of a particular device. FIG. 2B shows an illustrative embodiment of a method 208 for protecting a user device, corresponding to the system 200 shown in FIG. 2A. The method 208 comprises the following steps. At 210, a UWB communication unit of a system that includes a user device sets up a UWB communication channel with an external localization device and performs at least one localization operation through said UWB communication channel. Furthermore, at 212, a processing unit of said system detects an unauthorized displacement of the user device by analyzing an output of said localization operation. In this way, the level of protection against the unauthorized displacement of user devices may be increased.

In one or more embodiments, the user device comprises the UWB communication unit and the processing unit, or the UWB communication unit and the processing unit are attached to the user device. Thus, the UWB communication unit may be integrated into the user device. Since this will make it difficult for an attacker to decouple the UWB communication unit and the processing unit from the user device, the level of protection may be further increased. Alternatively, the UWB communication unit and the processing unit may be attached to the user device. In this way, the user device does not need to be adapted, which results in a backward compatibility with existing user devices and which offers an adequate solution for user devices in which additional components cannot easily be integrated. It is noted that in both cases the UWB communication unit and the processing unit may be combined into a single functional unit or be implemented as separate functional units. Furthermore, in one or more embodiments, the UWB communication unit and the processing unit are attached to the user device by a physical bonding. This may result in a practical implementation, which offers an adequate level of protection in case the UWB communication unit and the processing unit are attached to the user device.

In one or more embodiments, the processing unit is further configured to disable one or more functions of the user device or one or more applications executed by the user device in response to detecting the unauthorized displacement. In this way, the level of protection against the unauthorized displacement of user devices may be further increased. In particular, functions or applications of the user device may automatically be disabled if the processing unit integrated into or attached to the user device has detected an authorized displacement. The user device may then become effectively unusable by a thief, for example. Another advantage of automatically disabling the functions or application is that the user device autonomously detects (i.e., by means of an embedded processing unit or a processing unit attached to it) the authorized displacement and acts upon said detection, without for example requiring an explicit instruction provided by an external localization device.

In a practical implementation, the processing unit is configured to detect the unauthorized displacement by comparing location data output by said localization operation with one or more predefined sets of location data indicative of authorized locations of the user device. For instance, the predefined sets of location data may represent areas or zones in a building. In this way, authorized and unauthorized displacements can easily be tied to zones in which the user device is legitimately present (e.g., a shop floor) and zones in which the user device is illegitimately present (e.g., outside the shop floor if the user device has not been checked out or paid for).

Furthermore, in one or more embodiments, the processing unit is a secure element. It is relatively difficult to gain physical access to such a secure element. Thus, since the operations executed by the secure element cannot easily be manipulated, the level of protection against the unauthorized displacement of user devices may be further increased. It is noted that a secure element may be implemented as an embedded chip. More specifically, the secure element may be implemented as a tamper-resistant integrated circuit with installed or pre-installed applications, for instance payment applications, which have a prescribed functionality and a prescribed level of security. Furthermore, the secure element may implement security functions, such as cryptographic functions and authentication functions.

Figure 3A:
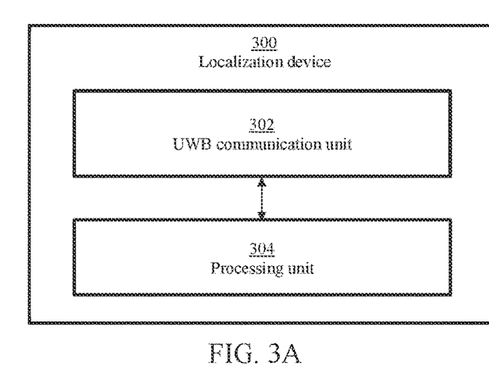
FIG. 3A shows an illustrative embodiment of a localization device.

FIG. 3A shows an illustrative embodiment of a localization device 300, The localization device 300 comprises a UWB communication unit 302 configured to set up a UWB communication channel with an external system (not shown) and to perform at least one localization operation through said UWB communication channel. Furthermore, the localization device 300 comprises a processing unit 304 configured to detect an unauthorized displacement of a user device comprised in said external system by analyzing an output of said localization operation. In this way, the level of protection against the unauthorized displacement of user devices may be increased. In particular, as an alternative of the embodiment shown in FIG. 2A, or as an addition thereto, an authorized displacement of a user device may be detected at the side of a localization device (for example, a supervisory system similar to the system shown in FIG. 1, complemented with UWB technology) instead of at the side of the user device (i.e., at the side of the object that should be localized). Such a supervisory system may for example raise an alarm when an unauthorized displacement has been detected.

Figure 3B:
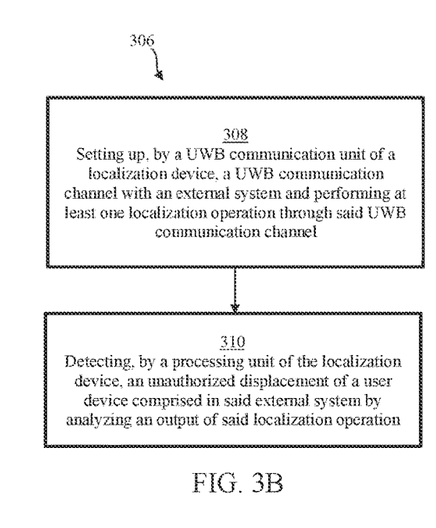
FIG. 3B shows another illustrative embodiment of a method for protecting a user device.

FIG. 3B shows another illustrative embodiment of a method 306 for protecting a user device, corresponding to the localization device 300 shown in FIG. 3A. The method 306 comprises the following steps. At 308, a UWB communication unit comprised in a localization device sets up a UWB communication channel with an external system and performs at least one localization operation through said UWB communication channel. Furthermore, at 310, a processing unit comprised in the localization device detects an unauthorized displacement of a user device comprised in said external system by analyzing an output of said localization operation. In this way, the level of protection against the unauthorized displacement of user devices may be increased.

In one or more embodiments, the processing unit is further configured to activate an alarm or transmit a warning signal in response to detecting the unauthorized displacement. In this way, surveillance personnel or a surveillance system can effectively act upon an unauthorized displacement of the user device. For instance, the warning signal can be transmitted to the mobile device of a guard or to the aforementioned surveillance system. The surveillance system may then perform any suitable operation, for example automatically alerting the authorities.

Furthermore, in one or more embodiments, the processing unit is configured to transmit, through the UWB communication channel or through an out-of-band communication channel, an instruction to disable one or more functions or applications of the user device to the external system. In this way, if the detection of the unauthorized displacement takes place at the side of the localization device, the user device can still be notified to take appropriate action, in order to render the user device effectively unusable by a thief, for example. It is noted that the out-of-band communication channel may be any suitable communication channel, for example Wi-Fi or Bluetooth. The use of an out-of-band communication channel may decrease the burden on the UWB communication channel.

Figure 4:
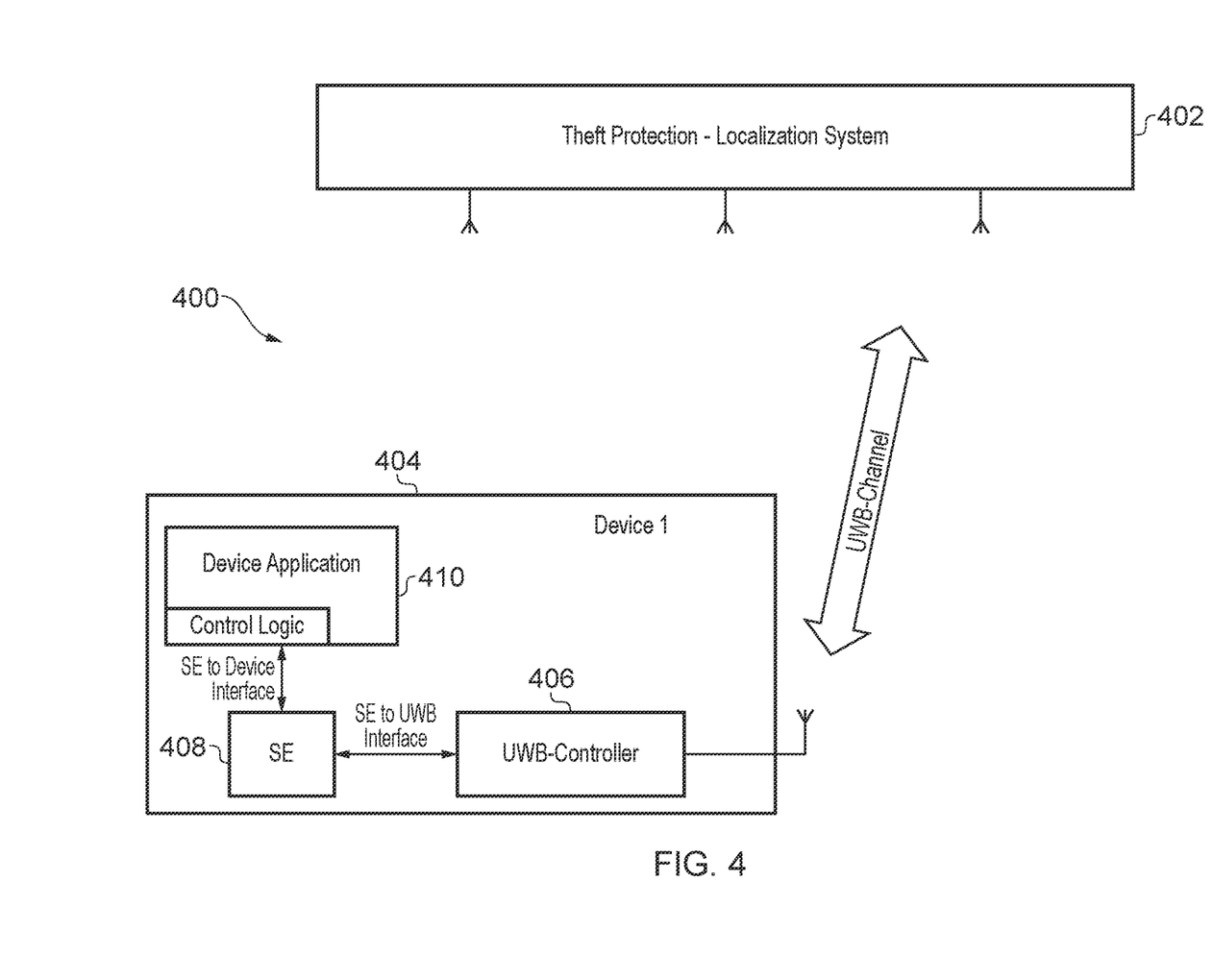
FIG. 4 shows an illustrative embodiment of a theft prevention system.

FIG. 4 shows an illustrative embodiment of a theft prevention system 400. The system 400 comprises a theft protection localization system 402 (i.e., an example of a localization device of the kind set forth) and a user device 404 that should be protected against theft. The user device 404 comprises a UWB controller 406 (i.e., an example of a UWB communication unit of the kind set forth), a secure element 408 (i.e., an example of a processing unit of the kind set forth), and an application 410 that can be executed by the user device 404 (e.g., a computer program that can be executed by a host processor included in the user device 404). It is noted that the secure element 408 is inherently a protected environment, while the host processor (not shown) may be relatively unprotected.

In particular, the system 400 includes central theft protection localization system 402 and at least one user device 404 (referred to as "Device1") that should be protected. In this embodiment, Device1 404 has an internal UWB controller 406 and a secure element 408, in addition to the hardware that is used for executing the device application 410. When Device1 404 is used the internal UWB controller 406 may continuously perform ranging operations with the central theft protection localization system 402. For the ranging operations both the UWB controller 406 and the heft protection localization system 402 may use a secure preamble, which makes it difficult for an attacker to change the estimated position of Device1 404 based on a relay or replay attack. In the system of Device1 404 the secure element 408 is also able to communicate with and control the application 410 that is executed by the host processor of Device1 404. If Device1 404 leaves an area where it is not allowed to be used (i.e., if it moves to a location where it is illegitimately present) the secure element 408 may disable (e.g., interrupt or suspend) the application 410 until Device1 404 enters an area where it is allowed to be used (i.e., if it moves back to a location where it is legitimately present). Furthermore, the central theft protection localization system 402 may raise an alarm based on a detected unauthorized displacement, of if the connection to Device1 404 is lost. For example, if an attacker tries to shield the signal transmitted by the UWB controller 406 of Device1 404, multiple messages will be lost and the corresponding ranging operations will fail. The unsuccessful ranging operations may lock the Device1 404 and the security personnel that supervises the theft protection localization system 402 may be informed that Device 404 has disappeared.

It is noted that if the UWB controller 406 and the secure element 408 are powered by a battery (not shown), then the localization of Device1 404 will also be possible if no power is received from an external source (e.g., a power socket). Via the UWB controller 406 Device1 404 can also report the battery information as well as additional information. Accordingly, the theft protection localization system 402 can be warned if Device1 404 has a critical battery status and the battery should be exchanged or recharged before it is empty. Thereby, the level of protection may be further increased. Additional data, such as the maintenance interval of Device1 404, can be also transmitted via the UWB controller 406. Furthermore, if Device1 404 has not been maintained for a given time duration, an alert can be triggered in the system in order to avoid unmaintained equipment.

Figure 5:
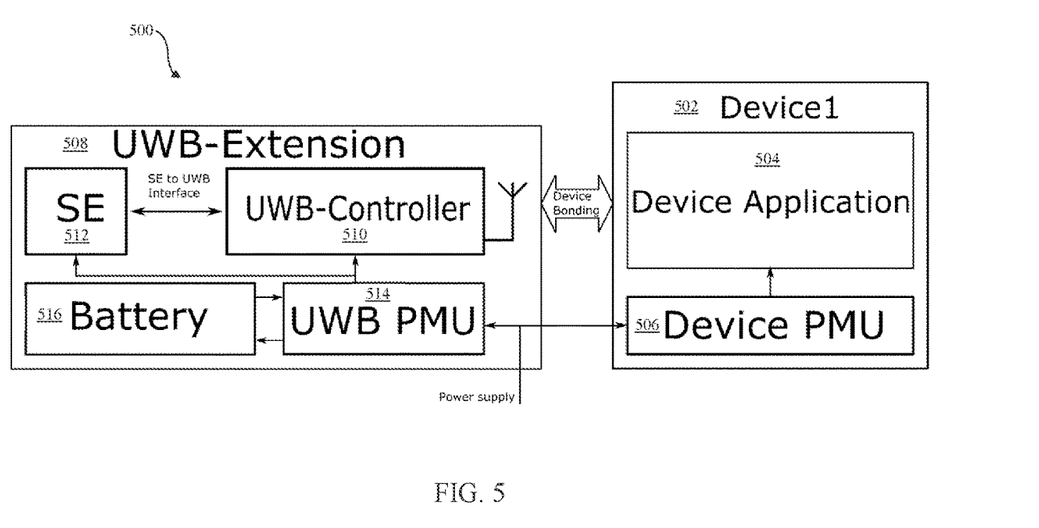
FIG. 5 shows an illustrative embodiment of a UWB extension system.

FIG. 5 shows an illustrative embodiment of a UWB extension system 500. The system 500 includes a user device 502, again referred to as Device1, and an UWB extension module 508. The UWB extension module 508 is attached to Device1 502, for example by means of a physical bonding of Device1 502. It is noted that the UWB extension module 508 provides Device1 502 with ranging functionality without requiring an adaptation of Device1 502. Device1 502 is configured to execute at least one application 504, for example by means of a host processor (not shown), Furthermore, Device1 502 contains a power management unit 506 which is configured to manage the power available in Device1 502. The UWB extension module 508 contains a UWB controller 510 (i.e., an example of a UWB communication unit of the kind set forth), a secure element 512 (i.e., an example of a processing unit of the kind set forth), a power management unit 514 for managing the power available in the UWB extension module 508, and a battery 516.

In particular, FIG. 5 shows a user device 502 that is extended with a UWB-based theft protection module 508. The application 504 executed by Device1 502 is executed independently from the UWB extension module 508, because it was not designed for being tracked and protected. Thus, when the UWB extension module 508 has been bonded to Device1 502, the UWB extension module 508 should notify a localization device of the kind set forth that for example the bonding has been broken or removed. Furthermore, the UWB extension module 508 should perform ranging operations with the localization device, such that the localization device can trigger an alert to a supervisor if an unauthorized displacement of Device1 502 is detected. Similarly, the localization device can trigger an alert when the connection to the UWB extension module 508 has been lost. Accordingly. Device1 502 cannot be stolen without notifying the supervising localization device, as long as the UWB extension module 508 is still powered.

It is noted that the UWB extension module 508 may use the same power supply as Device1 502, i.e. it may be powered by the same power socket that would be used for Device1 502. In that case, the UWB extension module 508 may offer an additional power socket, into which the bonded device (i.e., Device1 502) can be plugged. Since the UWB extension module 508 has its own battery 516 and power management unit 514, the UWB extension module 508 is also usable if it is not plugged into a power socket. Thus, the UWB extension module 508 also offers anti-theft protection if Device1 502 is not powered. Furthermore, By transmitting a battery status through the UWB communication channel, the localization device can be warned when the battery 516 is almost empty. Accordingly, the battery 516 can be recharged, for example by plugging the UWB extension module 508 into a power socket, or the battery 516 can be replaced by another battery. It is noted that the security level of an UWB extension module of the kind set forth may depend on two layers, i.e. the UWB layer that provides a relay attack-resistant localization function and a physical bonding that ensures that the UWB extension module remains attached to the user device that should be protected.

Figure 6:
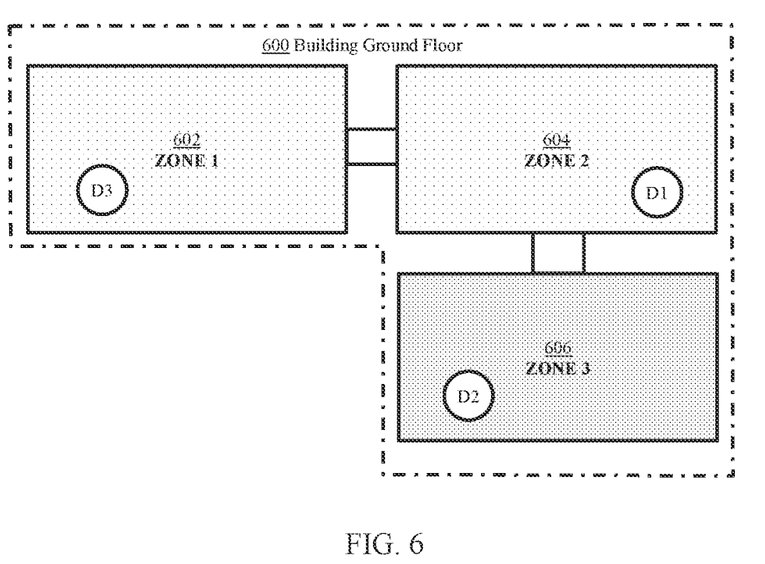
FIG. 6 shows an illustrative embodiment of a building ground floor.

FIG. 6 shows an illustrative embodiment of a building ground floor 600. The floor 600 contains a plurality of zones, i.e. a first zone 602, a second zone 604, and a third zone 606. In the given example, a first user device D1 is legitimately present in the second zone 604, a second user device D2 is illegitimately present in the third zone 606 (i.e., as a result of an unauthorized displacement), and a third device D3 is legitimately present in the first zone 602. A localization device of the kind set forth (not shown) tracks the position and movement of the devices D1, D2 and D3 on the building ground floor 600. Since devices D1 and D3 are legitimately present in zones 602 and 604, no alert is triggered by the movement of these devices, as long as they remain in these zones or move into another zone in which they are legitimately present. However, since device D2 is in zone 606 as a result of an unauthorized displacement, an alert is triggered and/or one or more functions or applications of device D2 are disabled automatically. More specifically, a processing unit of device D2 may disable said functions or application in response to detecting the unauthorized displacement, and/or a processing unit of the localization device may trigger the alert in response to detecting the unauthorized displacement. If only an UWB extension module is used, then only an alert may be raised to the localization device. The localization device can then decide whether for example a security alert notification should be triggered. It is noted that for a non-secure device tracking, no secure element is needed. Furthermore, the device bonding may be less relevant for non-secure applications. However, it is noted that an internal UWB communication unit (i.e., a UWB communication unit embedded in a user device) facilitates the autonomous disabling of functions and/or applications by the user device. Such an internal UWB communication unit may also prevent said unit from being decoupled or removed from the user device and its applications. Furthermore, it is noted that for each user device different areas may be defined in which the respective devices are legitimately and illegitimately present. This may for example be used to prevent that devices belonging to different rooms (e.g., offices) are mixed without raising a warning to a supervising system.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 attack scenario
102 supervisory multi-antenna system
104 user device
106 attached localizing device
108 attacking device
110 signal blocking element
200 system for protecting a user device
202 user device
204 UWB communication unit
206 processing unit
208 method for protecting a user device
210 setting up, by a UWB communication unit of a system that includes a user device, a UWB communication channel with an external localization device and performing at least one localization operation through said UWB communication channel
212 detecting, by a processing unit of said system, an unauthorized displacement of the user device by analyzing an output of said localization operation
300 localization device
302 UWB communication unit
304 processing unit
306 method for protecting a user device
308 setting up, by a UWB, communication unit of a localization device, a UWB communication channel with an external system and performing at least one localization operation through said UWB communication channel
310 detecting, by a processing unit of the localization device, an unauthorized displacement of a user device comprised in said external system by analyzing an output of said localization operation 400 theft prevention system
402 theft protection localization system
404 user device
406 UWB controller
408 secure element
410 device application
500 UWB extension system
502 user device
504 device application
506 device power management unit
508 UWB extension
510 UWB controller
512 secure element
514 UWB power management unit
516 battery
600 building ground floor
602 first zone
604 second zone
606 third zone

The invention claimed is:

1. A system, comprising:
a user device to be monitored for unauthorized displacement, wherein the unauthorized displacement is a movement of the user device to a location at which the user device is not authorized to be present according to a predefined rule;
an ultra-wideband (UWB) communication unit configured to set up a UWB communication channel with an external localization device and to perform at least one localization operation through said UWB communication channel using a UWB communication protocol;
a processing unit configured to:
detect said unauthorized displacement of the user device by analyzing an output of said localization operation, and
transmit, through an out-of-band communication channel using a second communication protocol that is different from the UWB communication protocol, an instruction to disable one or more functions or applications of the user device to the external system.

2. The system of claim 1, wherein the user device comprises the UWB communication unit and the processing unit or wherein the UWB communication unit and the processing unit are attached to the user device.

3. The system of claim 2, wherein the UWB communication unit and the processing unit are attached to the user device by a physical bonding.

4. The system of claim 1, wherein the processing unit is further configured to disable one or more functions of the user device or one or more applications executed by the user device in response to detecting the unauthorized displacement.

5. The system of claim 1, wherein the processing unit is configured to detect the unauthorized displacement by comparing location data output by said localization operation with one or more predefined sets of location data indicative of authorized locations of the user device.

6. The system of claim 5, wherein the predefined sets of location data represent areas or zones in a building.

7. The system of claim 1, wherein the processing unit is a secure element.

8. A localization device, comprising:
an ultra-wideband (UWB) communication unit configured to set up a UWB communication channel with an external system and to perform at least one localization operation through said UWB communication channel;
a processing unit configured to:
detect an unauthorized displacement of a user device comprised in said external system by analyzing an output of said localization operation, wherein the unauthorized displacement is a movement of the user device to a location at which the user device is not authorized to be present according to a predefined rule, and
transmit, through an out-of-band communication channel different from the UWB communication channel, an instruction to disable one or more functions or applications of the user device to the external system.

9. The localization device of claim 8, wherein the processing unit is further configured to activate an alarm or transmit a warning signal in response to detecting the unauthorized displacement.

10. A method, comprising:
setting up, by an ultra-wideband (UWB) communication unit of a system that includes a user device, a UWB communication channel with an external localization device and performing at least one localization operation through said UWB communication channel;
detecting, by a processing unit of said system, an unauthorized displacement of the user device by analyzing an output of said localization operation, wherein the unauthorized displacement is a movement of the user device to a location at which the user device is not authorized to be present according to a predefined rule; and
transmitting, through an out-of-band communication channel different from the UWB communication channel, an instruction to disable one or more functions or applications of the user device to an external system.

11. The method of claim 10, wherein the processing unit further disables one or more functions of the user device or one or more applications executed by the user device in response to detecting the unauthorized displacement.

12. A method, comprising:
setting up, by an ultra-wideband (UWB) communication unit of a localization device, a UWB communication channel with an external system and performing at least one localization operation through said UWB communication channel;
detecting, by a processing unit of the localization device, an unauthorized displacement of a user device comprised in said external system by analyzing an output of said localization operation, wherein the unauthorized displacement is a movement of the user device to a location at which the user device is not authorized to be present according to a predefined rule; and
transmitting, through an out-of-band communication channel different from the UWB communication channel, an instruction to disable one or more functions or applications of the user device to an external system.

13. The method of claim 12, wherein the processing unit further activates an alarm or transmits a warning signal in response to detecting the unauthorized displacement.

14. A system, comprising:
a user device to be monitored for unauthorized displacement, wherein the unauthorized displacement is a movement of the user device to a location at which the user device is not authorized to be present according to a predefined rule;

an ultra-wideband (UWB) communication unit configured to set up a UWB communication channel with an external localization device and to perform at least one localization operation through said UWB communication channel; and a processing unit configured to:
- detect said unauthorized displacement of the user device by analyzing an output of said localization operation, and
- transmit, through an out-of-band communication channel different from the UWB communication channel, an instruction to disable one or more functions of the user device to an external system.

15. The system of claim 14, wherein the user device comprises the UWB communication unit and the processing unit.

16. The system of claim 14, wherein the UWB communication unit and the processing unit are attached to the user device by a physical bonding.

17. The system of claim 14, wherein the processing unit is further configured to disable one or more applications executed by the user device in response to detecting the unauthorized displacement.

18. The system of claim 14, wherein the processing unit is configured to detect the unauthorized displacement by comparing location data output by said localization operation with one or more predefined sets of location data indicative of authorized locations of the user device.

19. The system of claim 18, wherein the predefined sets of location data represent areas or zones in a building.

\* \* \* \* \*